(12) United States Patent
Tanaka

(10) Patent No.: US 9,429,589 B2
(45) Date of Patent: Aug. 30, 2016

(54) PHYSICAL QUANTITY SENSOR AND ELECTRONIC APPARATUS

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/778,568

(22) Filed: Feb. 27, 2013

(65) Prior Publication Data

US 2013/0228013 A1    Sep. 5, 2013

(30) Foreign Application Priority Data

Mar. 2, 2012   (JP) ................. 2012-046260

(51) Int. Cl.
| | |
|---|---|
| G01P 15/00 | (2006.01) |
| G01P 15/13 | (2006.01) |
| G01P 15/08 | (2006.01) |
| G01P 15/125 | (2006.01) |

(52) U.S. Cl.
CPC .......... *G01P 15/08* (2013.01); *G01P 15/0802* (2013.01); *G01P 15/125* (2013.01); *G01P 2015/0831* (2013.01); *G01P 2015/0837* (2013.01)

(58) Field of Classification Search
CPC ............ B81B 2207/095; B81B 7/007; B81B 2201/0235; B81B 2207/012; G01P 15/0802
See application file for complete search history.

(56) References Cited

U.S. PATENT DOCUMENTS

| | | | |
|---|---|---|---|
| 5,404,749 A | 4/1995 | Spangler | |
| 5,488,864 A | 2/1996 | Stephan | |
| 5,905,203 A | 5/1999 | Flach et al. | |
| 6,513,380 B2 | 2/2003 | Reeds, III et al. | |
| 7,121,141 B2 | 10/2006 | McNeil | |
| 7,426,863 B2 | 9/2008 | Kuisma | |
| 8,079,262 B2 | 12/2011 | Guo | |
| 2009/0199637 A1* | 8/2009 | Sugiura et al. | ............ 73/514.32 |
| 2010/0089154 A1 | 4/2010 | Ballas et al. | |
| 2011/0265564 A1 | 11/2011 | Acar et al. | |
| 2011/0291644 A1* | 12/2011 | Kanemoto | .......... G01P 15/0802 324/162 |

FOREIGN PATENT DOCUMENTS

| | | |
|---|---|---|
| JP | 06-308152 | 11/1994 |
| JP | 09-189716 | 7/1997 |
| JP | 2007-298405 | 11/2007 |
| JP | 2008-544243 | 12/2008 |
| JP | 2009-109494 | 5/2009 |
| JP | 2010-089254 A | 4/2010 |
| WO | WO-2011-118786 A1 | 9/2011 |

\* cited by examiner

*Primary Examiner* — Harshad R Patel
*Assistant Examiner* — Brandi N Hopkins
(74) *Attorney, Agent, or Firm* — Harness, Dickey & Pierce, P.L.C.

(57) ABSTRACT

A physical quantity sensor includes a base section, a movable body having a movable electrode section, pivot sections connected to the movable body, and forming a pivot axis of the movable body, a fixation section fixed to the substrate, and adapted to support the movable body via the pivot sections, and a fixed electrode section disposed on the substrate so as to be opposed to the movable electrode section, and the fixation section is provided with opening sections disposed on a line of the pivot axis.

8 Claims, 7 Drawing Sheets

PHYSICAL QUANTITY SENSOR AND ELECTRONIC APPARATUS

BACKGROUND

1. Technical Field

The present invention relates to a physical quantity sensor and an electronic apparatus.

2. Related Art

In recent years, there have been developed physical quantity sensors such as an inertia sensor, for detecting a physical quantity using, for example, a silicon MEMS (micro-electromechanical system) technology.

For example, in JP-A-2008-544243 (Document 1), there is disclosed a capacitance physical quantity sensor for detecting the acceleration in a Z-axis direction (a vertical direction). In the physical quantity sensor of Document 1, a mass section is supported with torsional springs symmetrically with respect to the longitudinal direction of the mass section, and asymmetrically with respect to the thickness direction of the mass section.

However, in the physical quantity sensor according to Document 1, due to the influence of the stress caused by a difference in thermal expansion coefficient between a substrate (a wafer) forming the mass section and the torsional springs, and a seal member bonded to the substrate, the stress applied to the device when mounting the device, and so on, the characteristics such as a spring constant of the torsional springs are varied to thereby degrade the reliability in some cases.

SUMMARY

An advantage of some aspects of the invention is to provide a physical quantity sensor having high reliability. Another of the advantages of some aspects of the invention is to provide an electronic apparatus including the physical quantity sensor described above.

The invention can be implemented as the following forms or application examples.

APPLICATION EXAMPLE 1

A physical quantity sensor according to this application example includes a substrate, a movable body having a movable electrode section, a pivot section connected to the movable body, and forming a pivot axis of the movable body, a fixation section fixed to the substrate, and adapted to support the movable body via the pivot section, and a fixed electrode section disposed on the substrate so as to be opposed to the movable electrode section, and the fixation section is provided with an opening section disposed on the pivot axis.

According to such a physical quantity sensor, since the opening section is provided to the fixation section, it is possible to reduce the influence exerted on the pivot section by, for example, the stress caused by the difference in thermal expansion coefficient between the substrate and the fixation section, and the stress applied to the device when mounting the device. Therefore, it is possible to inhibit the characteristics such as the spring constant of the pivot section from varying to thereby improve the reliability.

APPLICATION EXAMPLE 2

In the physical quantity sensor according to this application example, the substrate may be formed of an insulating material, and the movable body may be formed of a semiconductor material.

According to such a physical quantity sensor, by forming the substrate from an insulating material such as glass, and forming the movable body from a semiconductor material such as silicon, the movable body and the substrate can easily be electrically isolated by bonding the movable body and the substrate to each other, and thus a sensor structure can be simplified.

APPLICATION EXAMPLE 3

In the physical quantity sensor according to this application example, the opening section may penetrate the fixation section.

According to such a physical quantity sensor, it is possible to further reduce the influence exerted on the pivot section by the stress caused by the difference in thermal expansion coefficient between the substrate and the fixation section, and the stress applied to the device when mounting the device.

APPLICATION EXAMPLE 4

In the physical quantity sensor according to this application example, the opening section may extend in a direction intersecting with the pivot axis.

According to such a physical quantity sensor, the path connecting the fixation section and the pivot section becomes to have an elongated shape, and thus, an influence of the distortion caused by the difference in thermal expansion coefficient can be reduced.

APPLICATION EXAMPLE 5

In the physical quantity sensor according to this application example, the movable body may have a mass different between one of regions bounded on the pivot axis and the other of the regions.

According to such a physical quantity sensor, when the acceleration in, for example, a vertical direction is applied, the rotational moment of the one of the regions of the movable body and the rotational moment of the other of the regions of the movable body are not balanced with each other, and it is possible to cause a predetermined tilt in the movable body.

APPLICATION EXAMPLE 6

In the physical quantity sensor according to this application example, the fixed electrode section may include a first detection electrode disposed at a position opposed to the one of the regions of the movable body, and a second detection electrode disposed at a position opposed to the other of the regions of the movable body.

According to such a physical quantity sensor, the amplitude and the direction of the acceleration can be detected based on the difference (differential signals) between the detection signal output from the first detection electrode and the detection signal output from the second detection electrode.

APPLICATION EXAMPLE 7

In the physical quantity sensor according to this application example, the fixation section may be disposed in a periphery of the movable body.

According to such a physical quantity sensor, it is possible to reliably fix the fixation section to the substrate.

APPLICATION EXAMPLE 8

In the physical quantity sensor according to this application example, the movable body may be provided with an opening section, and the fixation section may be disposed inside the opening section of the movable body.

According to such a physical quantity sensor, since the movable body can be supported at one place, it is possible to further reduce the influence exerted on the pivot section by the stress caused by the difference in thermal expansion coefficient between the substrate and the fixation section, and the stress applied to the device when mounting the device.

APPLICATION EXAMPLE 9

An electronic apparatus according to this application example includes the physical quantity sensor according to the application example described above.

According to such an electronic apparatus, since the physical quantity sensor according to the application example is included, high reliability can be achieved.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a preferred embodiment of the invention will be described in detail with reference to the accompanying drawings. It should be noted that the embodiment described below does not unreasonably limit the contents of the invention as set forth in the appended claims. Further, all of the constituents described below are not necessarily essential elements of the invention.

1. Physical Quantity Sensor

Figure 1:
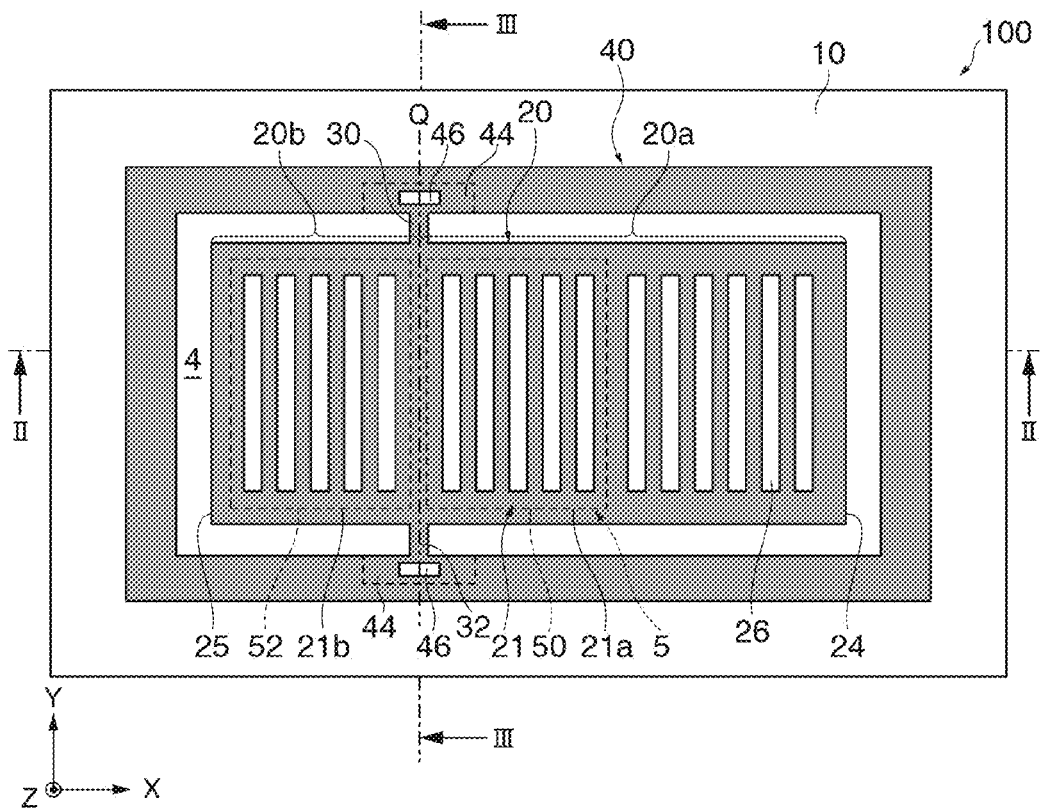
FIG. 1 is a plan view schematically showing a physical quantity sensor according to an embodiment of the invention.
Figure 2:
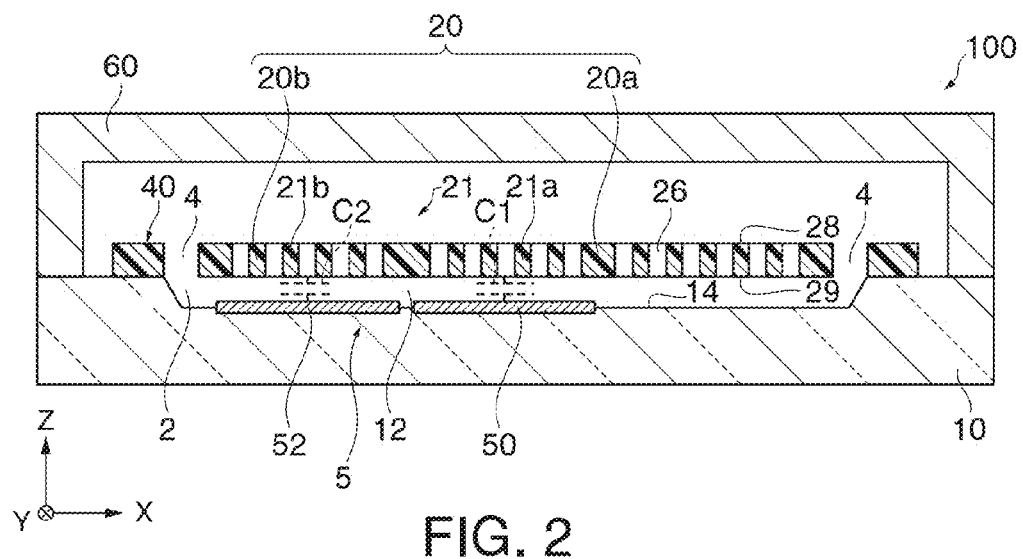
FIG. 2 is a cross-sectional view schematically showing the physical quantity sensor according to the embodiment.
Figure 3:
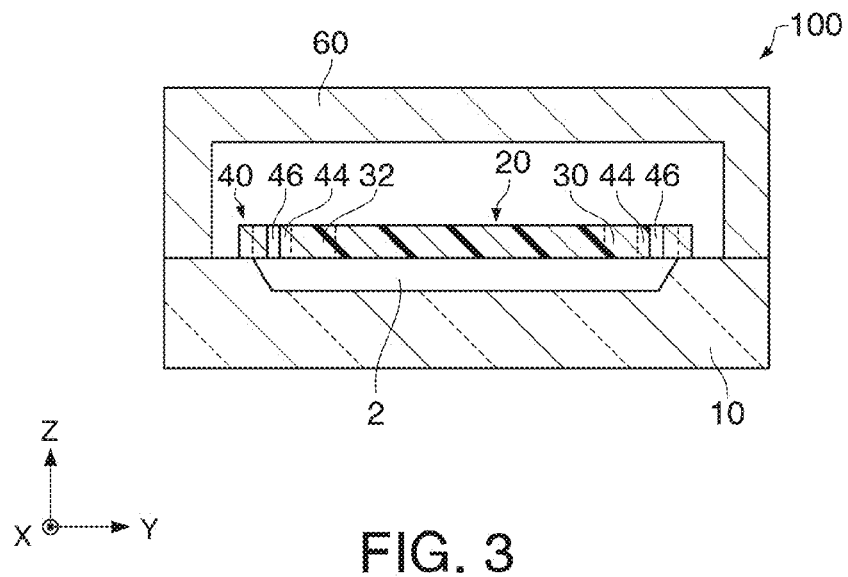
FIG. 3 is a cross-sectional view schematically showing the physical quantity sensor according to the embodiment.

Firstly, a physical quantity sensor according to the present embodiment will be explained with reference to the accompanying drawings. FIG. 1 is a plan view schematically showing the physical quantity sensor 100 according to the present embodiment. FIGS. 2 and 3 are cross-sectional views schematically showing the physical quantity sensor 100 according to the present embodiment. It should be noted that FIG. 2 is a cross-sectional view along the II-II line shown in FIG. 1, and FIG. 3 is a cross-sectional view along the III-III line shown in FIG. 1. Further, in FIG. 1, the graphical description of a lid body 60 is omitted for the sake of convenience. In FIGS. 1 through 3, an X axis, a Y axis, and a Z axis are shown as three axes perpendicular to each other.

The physical quantity sensor 100 can be used as an inertia sensor, and in particular, as an acceleration sensor (a capacitance acceleration sensor, a capacitance MEMS acceleration sensor) for measuring the acceleration in the vertical direction (the Z-axis direction), for example.

As shown in FIGS. 1 through 3, the physical quantity sensor 100 is configured including a support substrate (a substrate) 10, a movable body 20, first and second pivot sections 30, 32, a fixation section 40, a first detection electrode 50, a second detection electrode 52, and the lid body 60.

The support substrate 10 is provided with a fixed electrode section 5 (the first detection electrode 50 and the second detection electrode 52). In the example shown in the drawings, the detection electrodes 50, 52 are disposed on a surface 14 defining a bottom section of a recessed section 12 of the support substrate 10. Further, to the support substrate 10, there are bonded the fixation section 40 and the lid body 60. The support substrate 10 and the lid body 60 can form a space for housing the movable body 20. The material of the support substrate 10 is, for example, glass although not particularly limited.

The movable body 20 is disposed above the support substrate 10. The movable body 20 is supported by the first pivot section 30 and the second pivot section 32. When the acceleration in the vertical direction (the Z-axis direction) occurs, for example, the movable body 20 can perform a see-saw rocking action (a see-saw action) taking the support axis Q determined by the pivot sections 30, 32 as a rocking axis (a pivot axis). The support axis Q is a straight line (an imaginary straight line) forming the pivot axis of the movable body 20. The planar shape (the shape viewed from the Z-axis direction) of the movable body 20 is, for example, a rectangle shape.

The movable body 20 has a first see-saw element 20a, and a second see-saw element 20b. The first see-saw element 20a is one (a part located on the right in FIG. 1) of two parts of the movable body 20 sectioned by the support axis Q in the plan view. The second see-saw element 20b is the other (a part located on the left in FIG. 1) of the two parts of the movable body 20 sectioned by the support axis Q in the plan view.

For example, when the acceleration (e.g., gravitational acceleration) in the vertical direction (the Z-axis direction) is applied to the movable body 20, a rotational moment (a moment of force) occurs in each of the first see-saw element 20a and the second see-saw element 20b. Here, if the rotational moment (e.g., a clockwise rotational moment) of the first see-saw element 20a and the rotational moment (e.g., a counterclockwise rotational moment) of the second see-saw element 20b are balanced with each other, no variation in tilt is caused in the movable body 20, and it is not achievable to detect the variation in acceleration. Therefore, the movable body 20 is designed so that the rotational moment of the first see-saw element 20a and the rotational moment of the second see-saw element 20b are not balanced with each other to cause a predetermined tilt in the movable body 20 when the acceleration in the vertical direction (the Z-axis direction) is applied.

In the physical quantity sensor 100, since the support axis Q is disposed at a position shifted from the center (the center of gravity) of the movable body 20 (the distances from the support axis Q to the tips of the respective see-saw elements 20a, 20b are made different from each other), the see-saw elements 20a, 20b have respective masses different from each other. In other words, the movable body 20 is different in mass between one (the first see-saw element 20a) of regions bounded on the support axis Q and the other (the second see-saw element 20b) thereof. In the example shown in the drawings, the distance from the support axis Q to an end surface 24 of the first see-saw element 20a is greater than the distance from the support axis Q to an end surface 25 of the second see-saw element 20b. Further, the thickness of the first see-saw element 20a and the thickness of the second see-saw element 20b are equal to each other. Therefore, the mass of the first see-saw element 20a is greater than the mass of the second see-saw element 20b. As described above, since the see-saw elements 20a, 20b have the respective masses different from each other, it is possible to prevent the rotational moment of the first see-saw element 20a and the rotational moment of the second see-saw element 20b from being balanced with each other when the acceleration in the vertical direction (the Z-axis direction) is applied. Therefore, it is possible to generate a predetermined tilt in the movable body 20 when the acceleration in the vertical direction (the Z-axis direction) is applied.

It should be noted that it is also possible to arrange that the support axis Q is disposed at the center of the movable body 20, and the thicknesses of the see-saw elements 20a, 20b are made different from each other to thereby provide the see-saw elements 20a, 20b with respective masses different from each other, although not shown in the drawings. In also such a case, it is possible to generate a predetermined tilt in the movable body 20 when the acceleration in the vertical direction (the Z-axis direction) is applied.

The movable body 20 is disposed so as to have a space with the support substrate 10. In the example shown in the drawings, a gap 2 is disposed between the movable body 20 and the support substrate 10. Further, the movable body 20 is connected to the fixation section 40 with the pivot sections 30, 32 with a space with the fixation section 40. Between the movable body 20 and the fixation section 40 there is disposed a gap 4. Since the gaps 2, 4 exist in the periphery of the movable body 20, the movable body 20 can perform the see-saw rocking action.

The movable body 20 is provided with a movable electrode section 21. The movable electrode section 21 has movable electrodes 21a, 21b. It should be noted that the movable electrode section 21 can also be formed of either one of the movable electrodes 21a, 21b. It is also possible to form the movable electrodes by forming the movable body 20 from an electrically conductive material, or it is also possible to form the movable electrodes each formed of a conductive layer made of metal or the like on the surface of the movable body 20. In the example shown in the drawings, the movable electrodes 21a, 21b are formed by forming the movable body 20 from the electrically conductive material (silicon doped with an impurity). Specifically, the first see-saw element 20a functions as the movable electrode 21a, and the second see-saw element 20b functions as the movable electrode 21b.

The support substrate 10 is provided with the fixed electrode section 5 disposed so as to be opposed to the movable electrode section 21. In the example shown in the drawings, the fixed electrode section 5 has the first detection electrode 50 and the second detection electrode 52. At a position of the support substrate 10, which is opposed to the movable electrode 21a, there is disposed the first detection electrode 50. The movable electrode 21a and the first detection electrode 50 constitute a variable capacitance C1. At a position of the support substrate 10, which is opposed to the movable electrode 21b, there is disposed the second detection electrode 52. The movable electrode 21b and the second detection electrode 52 constitute a variable capacitance C2. The variable capacitance C1 and the variable capacitance C2 are configured so as to have the same capacitance value in a state in which the movable body 20 shown in FIG. 2 is in a horizontal state. The movable electrode 21a and the movable electrode 21b are changed in position in accordance with the see-saw rocking action of the movable body 20. Thus, the capacitance values of the variable capacitances C1, C2 are varied. In the example shown in the drawings, since the movable body 20 itself constitutes the movable electrodes 21a, 21b, the movable electrodes 21a, 21b are the electrode having the same electrical potential. The movable body 20 is provided with a predetermined electrical potential via the pivot sections 30, 32.

It should be noted that, although not graphically described, the first detection electrode 50 can be disposed at a position in the lid body 60 opposed to the movable electrode 21a, and the second detection electrode 52 can be disposed at a position of the lid body 60 opposed to the movable electrode 21b.

The movable body 20 is provided with through holes (slits) 26 each penetrating the movable body 20 from the upper surface 28 of the movable body 20 to the lower surface 29 thereof. Thus, an influence (air resistance) of air caused when the movable body 20 rocks can be reduced. In the example shown in the drawings, the plurality of through holes 26 is disposed.

The first pivot section 30 and the second pivot section 32 are connected to the movable body 20 to form the pivot axis of the movable body 20. The first pivot section 30 and the second pivot section 32 support the movable body 20. The first pivot section 30 and the second pivot section 32 have a strong restoring force with respect to the torsional deformation caused by the see-saw rocking action of the movable body 20.

As shown in FIG. 1, the first pivot section 30 and the second pivot section 32 are disposed on the support axis Q in the plan view. The first pivot section 30 and the second pivot section 32 are members for determining the position of the support axis Q forming a rotational center (a rocking center) of the movable body 20. The first pivot section 30 and the second pivot section 32 each extend from the fixation section 40 to the movable body 20. The extending direction (the Y-axis direction) of the first pivot section 30 and the second pivot section 32 is a direction along the support axis Q.

The fixation section 40 is disposed so as to surround the movable body 20. The fixation section 40 and the movable body 20 have a space therebetween, and the gap 4 is disposed between the fixation section 40 and the movable body 20. The fixation section 40 is fixed to the support substrate 10. The fixation section 40 is disposed in the periphery of the movable body 20 in the plan view as shown in FIG. 1. The fixation section 40 has connection sections 44. The fixation section 40 is connected to the pivot sections 30, 32 in the connection sections 44. In the example shown in the drawings, the connection section 44 located on one side (the +Y direction side) of the movable body 20 and the first pivot section 30 are connected to each other, and the connection section 44 located on the other side (the −Y direction side) of the movable body 20 and the second pivot section 32 are connected to each other. Therefore, the movable body 20 is supported at two places, namely the place on the one side (the +Y direction side) of the movable body 20 and the place on the other side (the −Y direction side) of the movable body 20.

The connection sections 44 are connected respectively to the pivot sections 30, 32. In the example shown in the drawings, there are disposed the two connection sections 44 across the movable body 20. One (the +Y direction side) of the connection sections 44 is connected to the first pivot section 30, and the other (the −Y direction side) of the connection sections 44 is connected to the second pivot section 32. The connection sections 44 are separated from the support substrate 10 with the gap 2. In other words, the connection sections 44 do not have contact with the support substrate 10. As shown in FIG. 1, in the plan view, the connection sections 44 can be the portions of the fixation section 40 not bonded to (the portions thereof having no contact with) the support substrate 10.

The connection sections 44 are each provided with an opening section 46. The opening section 46 is disposed in the vicinity of the portion of the connection section 44, to which the pivot sections 30, 32 are connected. The opening section 46 is located above the support axis Q (the straight line forming the pivot axis of the movable body 20) in the plan view as shown in FIG. 1. In the example shown in the drawings, the center of the opening section 46 is located on the support axis Q. The opening section 46 extends in a direction (a direction perpendicular thereto in the example shown in drawings) intersecting with the support axis Q (the pivot axis). Thus, the path connecting the fixation section 40 and each of the pivot sections 30, 32 becomes to have an elongated shape, and thus, an influence of the distortion caused by the difference in thermal expansion coefficient can be reduced. The planar shape of the opening section 46 is not particularly limited, but can have an arbitrary shape. In the example shown in the drawings, the planar shape of the opening section 46 is a rectangular shape having a width greater than the width (the dimension in the X-axis direction) of the pivot sections 30, 32. The opening section 46 penetrates the fixation section 40 (the connection section 44). It should be noted that the opening section 46 is not required to penetrate the fixation section 40 (the connection section 44).

The movable body 20, the fixation section 40, and the pivot sections 30, 32 are integrally disposed. The movable body 20, the fixation section 40, and the pivot sections 30, 32 are integrally disposed by patterning a single substrate (a silicon substrate). For example, by forming the support substrate 10 from an insulating material such as glass, and forming the movable body from a semiconductor material such as silicon, the movable body 20 and the support substrate 10 can easily be electrically isolated by bonding the movable body 20 and the support substrate 10 to each other, and thus a sensor structure can be simplified.

The fixed electrode section 5 has the first detection electrode 50 and the second detection electrode 52. The first detection electrode 50 is disposed on the support substrate 10. The first detection electrode 50 is disposed at a position opposed to the movable body 20 (the movable electrode 21a). The movable electrode 21a is located above the first detection electrode 50 via the gap 2. The first detection electrode 50 is disposed so as to form the capacitance C1 with the movable electrode 21a.

The second detection electrode 52 is disposed on the support substrate 10. The second detection electrode 52 is disposed at a position opposed to the movable body 20 (the movable electrode 21b). The movable electrode 21b is located above the second detection electrode 52 via the gap 2. The second detection electrode 52 is disposed so as to form the capacitance C2 with the movable electrode 21b. The planar shape of the first detection electrode 50 and the planar shape of the second detection electrode 52 are axisymmetric about, for example, the support axis Q.

The material of the detection electrodes 50, 52 is, for example, aluminum-gold, or indium tin oxide (ITO). The material of the detection electrodes 50, 52 is preferably a transparent electrode material such as ITO. This is because, by using the transparent electrode material for the detection electrodes 50, 52, a foreign matter existing on the detection electrodes 50, 52 and so on can visually be recognized with ease if the support substrate 10 is a transparent substrate (a glass substrate).

The lid body 60 is mounted on the support substrate 10. As the lid body 60, a silicon substrate (a substrate made of silicon) can be used. If a glass substrate is used as the support substrate 10, the support substrate 10 and the lid body 60 can also be bonded to each other by anodic bonding.

Figure 4A:
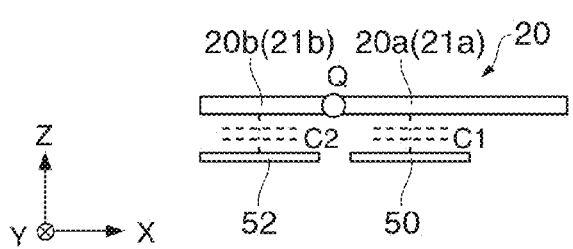
FIGS. 4A through 4C are diagrams for explaining an action of a movable body and variations in capacitance value of variable capacitances.
Figure 4B:
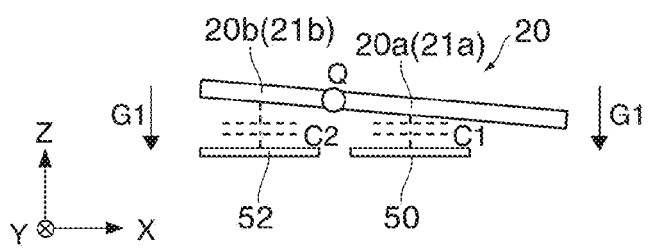
Figure 4C:
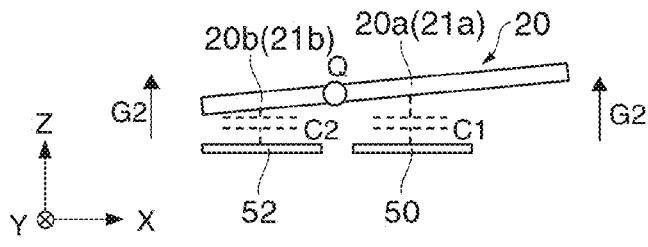

Then, an action of the movable body 20 and the variations in capacitance value of the variable capacitances C1, C2 due to the action are explained. FIGS. 4A through 4C are diagrams for explaining the action of the movable body 20 and a variation in capacitance value of the variable capacitances C1, C2.

In FIG. 4A, the movable body 20 keeps a horizontal state (the state corresponds to the state with no gravitational acceleration (zero-gravity state)). The distance between the support axis Q and the tip of the first see-saw element 20a is greater than the distance between the support axis Q and the tip of the second see-saw element 20b. Therefore, if the acceleration in the vertically downward direction (the −Z-axis direction) is generated, for example, in the state shown in FIG. 4A, the rotational moment generated in the first see-saw element 20a is greater than the rotational moment generated in the second see-saw element 20b, and it results that the movable body 20 rotates clockwise.

In the state shown in FIG. 4B, gravitational acceleration G1 (=1 G), for example, is applied to the movable body 20. In accordance therewith, the movable body 20 rotates clockwise, and a tilt is caused in the movable body 20. Due to the see-saw rocking action of the movable body 20, the distance between the movable electrode 21a and the first detection electrode 50 decreases, and as a result, the capacitance value of the variable capacitance C1 increases. On the other hand, the distance between the movable electrode 21b and the second detection electrode 52 increases, and as a result, the capacitance value of the variable capacitance C2 decreases. In the physical quantity sensor 100, the amplitude and the direction of the acceleration can be detected in accordance with two detection signals (differential signals) representing the variations in capacitance value of the variable capacitances C1, C2. Specifically, the value (=1 G) of the gravitational acceleration G1 can be detected in accordance with the levels of the respective variations of the two detection signals. Further, based on the directions of the respective variations of the two detection signals, the direction (the vertically downward direction, the −Z-axis direction) of the acceleration can be identified.

In the state shown in FIG. 4C, acceleration G2 in the vertically upward direction (the +Z-axis direction) is further applied to the movable body 20 in the state in which the gravitational acceleration (=1 G) is continuously applied to the movable body 20. In this case, the movable body 20 rotates counterclockwise, and the tilt opposite to the tilt in the case shown in FIG. 4B is caused in the movable body 20. Due to the see-saw rocking action of the movable body 20, the distance between the movable electrode 21a and the first detection electrode 50 increases, and as a result, the capacitance value of the variable capacitance C1 decreases. On the other hand, the distance between the movable electrode 21b and the second detection electrode 52 decreases, and as a result, the capacitance value of the variable capacitance C2 increases.

By evaluating the detection signal in the state shown in FIG. 4C taking the detection signal (i.e., the amplitude and the direction of the gravitational acceleration) obtained in the state shown in FIG. 4B as a reference, what amplitude of acceleration is applied in which direction in the state shown in FIG. 4C can be detected. In other words, the value of the acceleration G2 applied thereto can be detected from the levels of the respective variations of the two detection signals based on the two detection signals obtained in the state shown in FIG. 4C. Further, based on the directions of the respective variations of the two detection signals, the direction (the vertically upward direction, the +Z-axis direction) of the acceleration G2 can be identified.

As described above, the physical quantity sensor 100 can be used as an inertia sensor such as an acceleration sensor or a gyro sensor, and specifically as a capacitance acceleration sensor for measuring the acceleration in the vertical direction (the Z-axis direction), for example.

The physical quantity sensor 100 according to the present embodiment has the following features, for example.

In the physical quantity sensor 100, the fixation section 40 is provided with the opening sections 46, and the opening sections 46 are disposed on the support axis (the line of the pivot axis) Q. Thus, it is possible to reduce the influence exerted on the pivot sections 30, 32 by, for example, the stress caused by the difference in thermal expansion coefficient between the support substrate 10 and the fixation section 40, and the stress applied to the device when mounting the device. For example, if the force (external force) is applied to the pivot sections due to these stresses caused therein, the characteristics such as the spring constant of the pivot sections are varied. In the physical quantity sensor 100, the external force can be prevented from being applied to the pivot sections by providing the opening sections 46 to the fixation section 40. Therefore, according to the physical quantity sensor 100, it is possible to inhibit the characteristics such as the spring constant of the pivot section from varying to thereby improve the reliability.

In the physical quantity sensor 100, the connection sections 44 are separated from the support substrate 10 with the gap 2. Therefore, it is possible to further reduce the influence exerted on the pivot sections 30, 32 by, for example, the stress caused by the difference in thermal expansion coefficient between the support substrate 10 and the fixation section 40, and the stress applied to the device when mounting the device. If the connection sections have contact with the support substrate, the stress is caused by the difference in thermal expansion coefficient between the connection sections and the support substrate. However, such a problem does not arise in the physical quantity sensor 100. Further, in the physical quantity sensor 100, since the opening sections 46 penetrate the connection sections 44, the influence exerted on the pivot sections 30, 32 by the stress can further be reduced.

In the physical quantity sensor 100, the pivot sections 30, 32 are disposed on the support axis Q, and the movable body 20 is different in mass between one (the first see-saw element 20a) of regions bounded on the support axis Q and the other (the second see-saw element 20b) thereof in the plan view. Thus, the rotational moment of the one region (the first see-saw element 20a) of the movable body 20 and the rotational moment of the other region (the second see-saw element 20b) of the movable body 20 are not balanced with each other, and thus a predetermined tilt can be generated in the movable body 20 when the acceleration in the vertical direction (the Z-axis direction) is applied.

In the physical quantity sensor 100, the fixation section 40 is disposed in the periphery of the movable body 20. Thus, the fixation section 40 can reliably be fixed to the support substrate 10.

2. Method of Manufacturing Physical Quantity Sensor

Then, a method of manufacturing the physical quantity sensor according to the present embodiment will be explained with reference to the accompanying drawings. FIGS. 5 through 8 are cross-sectional views schematically showing a manufacturing process of the physical quantity sensor 100 according to the present embodiment.

Figure 5:
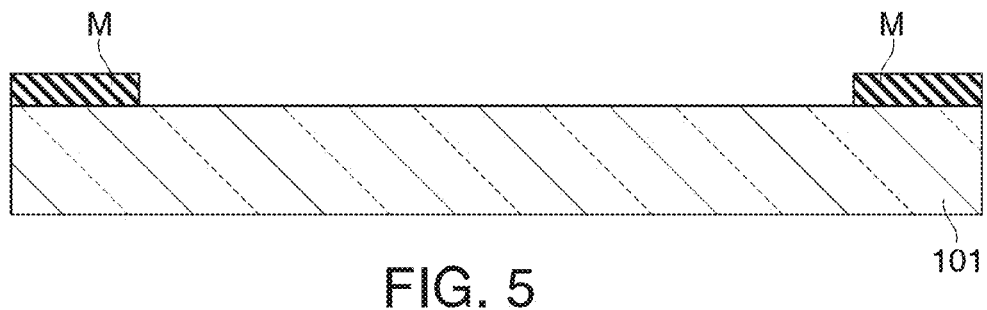
FIG. 5 is a cross-sectional view schematically showing a manufacturing process of the physical quantity sensor according to the embodiment.

As shown in FIG. 5, a mask M is formed on, for example, a glass substrate 101. The mask M is formed by depositing an insulating layer on the glass substrate 101 using, for example, a sputtering method or a coating method, and then patterning the insulating layer into a predetermined shape.

Figure 6:
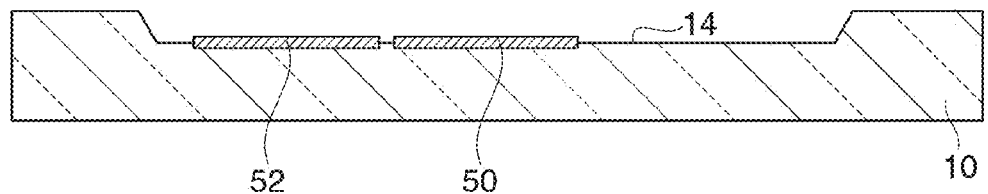
FIG. 6 is a cross-sectional view schematically showing the manufacturing process of the physical quantity sensor according to the embodiment.

As shown in FIG. 6, wet etching is performed on the glass substrate 101 using the mask M as a mask to thereby form the recessed section 12. Thus, the support substrate 10 can be formed. Then, the mask M is removed. Subsequently, the first detection electrode 50 and the second detection electrode 52 are formed on the surface 14 defining the bottom of the recessed section 12. The detection electrodes 50, 52 are each formed by depositing a conductive layer on the surface 14 of the support substrate 10 using a sputtering method or the like, and then patterning the conductive layer using a photolithography technology and an etching technology.

Figure 7:
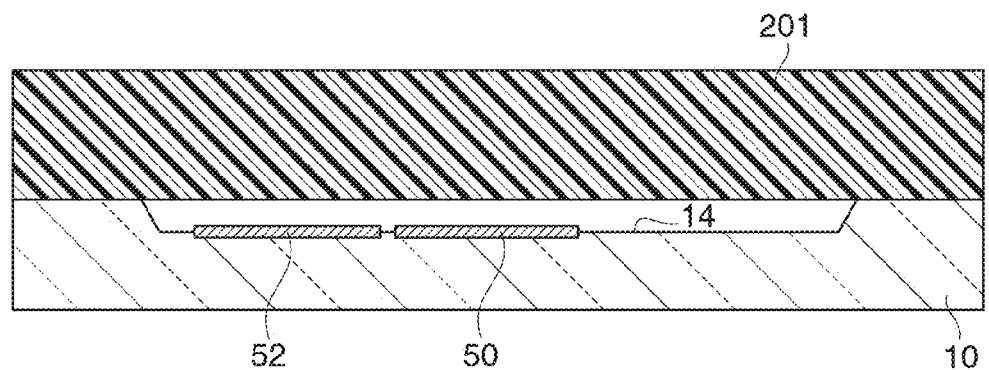
FIG. 7 is a cross-sectional view schematically showing the manufacturing process of the physical quantity sensor according to the embodiment.

As shown in FIG. 7, a silicon substrate 201 (a sensor substrate) is bonded to the support substrate 10. The bonding between the support substrate 10 and the silicon substrate 201 is performed using, for example, anodic bonding, direct bonding, or an adhesive.

Figure 8:
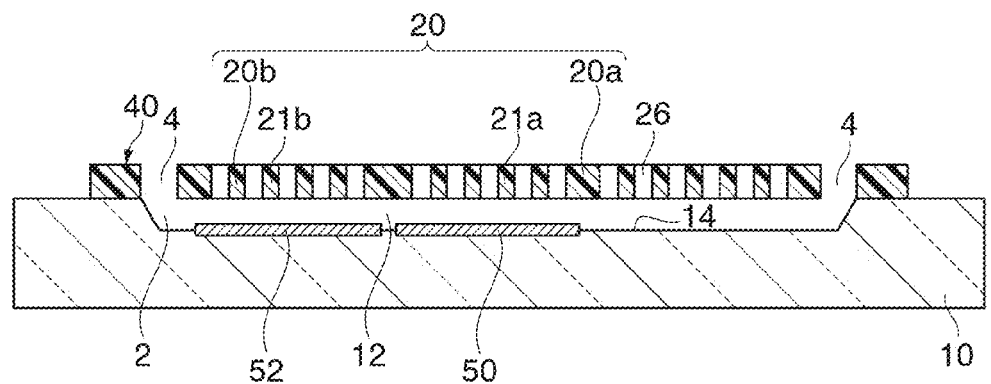
FIG. 8 is a cross-sectional view schematically showing the manufacturing process of the physical quantity sensor according to the embodiment.

As shown in FIG. 8, the movable body 20, the pivot sections 30, 32, and the fixation section 40 are formed by grinding the silicon substrate 201 using, for example, a grinding machine to form a thin film, and then patterning it into a predetermined shape. The patterning is performed using a photolithography technology and an etching technology (dry etching), and as a more specific etching technology, the Bosch method can be used. In the present process, by patterning (etching) the silicon substrate 201, the movable body 20, the pivot sections 30, 32, and the fixation section 40 (the opening sections 46) are formed integrally.

As shown in FIGS. 1 through 3, the lid body 60 is bonded to the support substrate 10 to thereby house the movable body 20 in the space formed by the support substrate 10 and the lid body 60. The bonding between the support substrate 10 and the lid body 60 is performed using, for example, anodic bonding, or an adhesive.

According to the process described hereinabove, the physical quantity sensor 100 can be manufactured.

3. Modified Example of Physical Quantity Sensor

Figure 9:
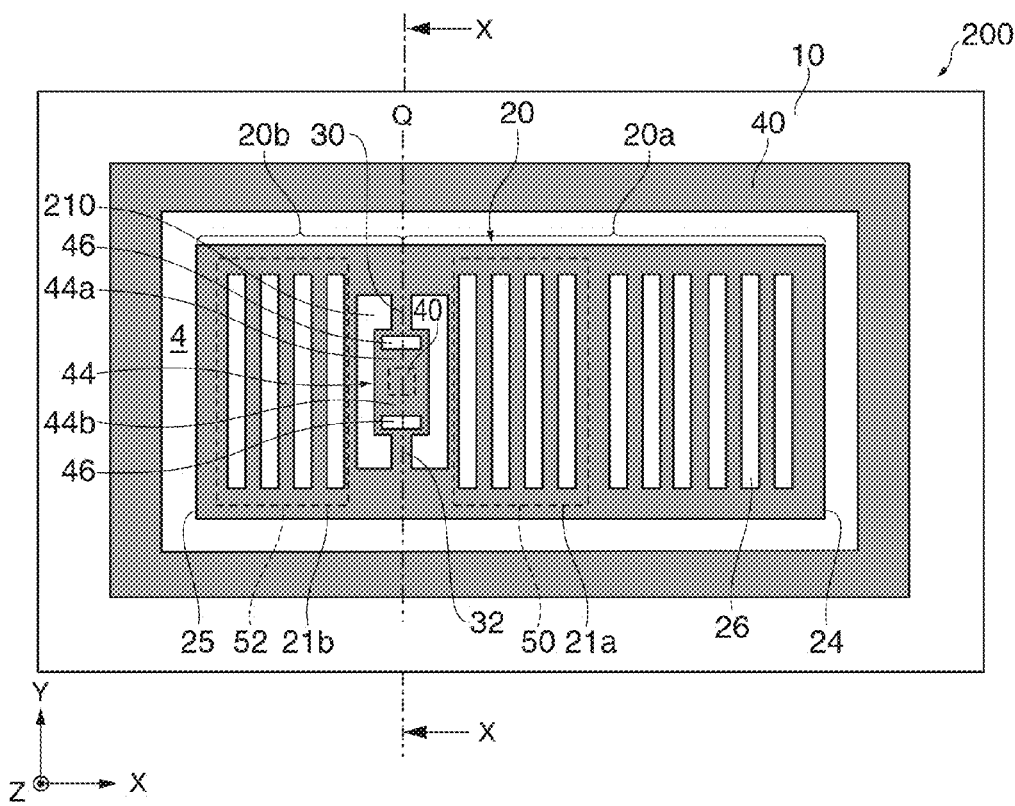
FIG. 9 is a plan view schematically showing the physical quantity sensor according to a modified example of the embodiment.
Figure 10:
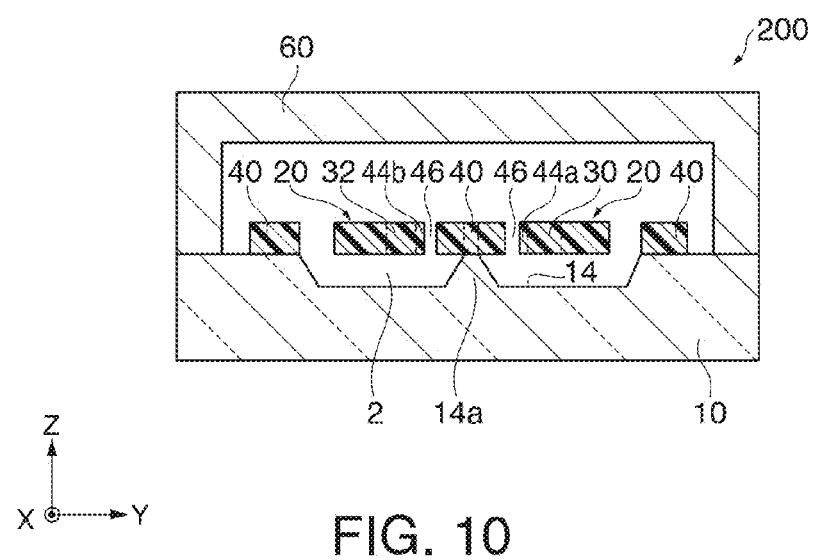
FIG. 10 is a cross-sectional view schematically showing the physical quantity sensor according to the modified example of the embodiment.

Then, a physical quantity sensor according to a modified example of the present embodiment will be explained with reference to the accompanying drawings. FIG. 9 is a plan view schematically showing the physical quantity sensor 200 according to the modified example of the present embodiment. FIG. 10 is a cross-sectional view schematically showing the physical quantity sensor 200 according to the modified example of the present embodiment. It should be noted that FIG. 10 is a cross-sectional view along the X-X line shown in FIG. 9. Hereinafter, in the physical quantity sensor 200 according to the modified example of the present embodiment, the constituents thereof having the same functions as those of the constituents of the physical quantity sensor 100 according to the present embodiment will be denoted with the same reference symbols, and the detailed explanation thereof will be omitted.

In the example of the physical quantity sensor 100 described above, the fixation section 40 is disposed in the periphery of the movable body 20 as shown in FIG. 1. Therefore, the movable body 20 is supported at the two places.

In contrast, as shown in FIGS. 9 and 10, in the physical quantity sensor 200, the movable body 20 is provided with an opening section 210, and the fixation section 40 is disposed inside the opening section 210 of the movable body 20. Therefore, the movable body 20 is supported at one place.

The fixation section 40 is disposed inside the opening section 210 provided to the movable body 20. The fixation section 40 is disposed on the support axis Q in the plan view as a single section. The fixation section 40 is bonded to a projection section 14*a* disposed on the surface 14 of the support substrate 10. The projection section 14*a* can also be provided with a wiring line (not shown) for supplying the movable body 20 with a predetermined electrical potential.

The connection section 44 has a first portion 44*a* extending from a portion of the fixation section 40, at which the fixation section 40 is bonded to the projection section 14*a*, toward the +Y direction, and a second portion 44*b* extending from the fixation section 40 toward the −Y direction. The fixation section 40 and the first pivot section 30 are connected to each other via the first portion 44*a* of the connection section 44. The fixation section 40 and the second pivot section 32 are connected to each other via the second portion 44*b* of the connection section 44.

The first pivot section 30 extends from the first portion 44*a* of the connection section 44 to the movable body 20 toward the +Y direction. The second pivot section 32 extends from the second portion 44*b* of the connection section 44 to the movable body 20 toward the −Y direction. In the example shown in the drawings, the fixation section 40, the connection section 44, the opening sections 46, and the pivot sections 30, 32 are disposed on the support axis Q.

According to the physical quantity sensor 200, the fixation section 40 is disposed inside the opening section 210 of the movable body 20. Therefore, the movable body 20 can be supported at one place. Thus, it is possible to further reduce the influence exerted on the pivot sections by the stress caused by the difference in thermal expansion coefficient between the support substrate and the fixation section, the stress applied to the device when mounting the device, and so on compared to, for example, the case in which the movable body is supported at the two places.

4. Electronic Apparatus

Then, an electronic apparatus according to the present embodiment will be explained with reference to the accompanying drawings. The electronic apparatus according to the present embodiment includes the physical quantity sensor according to the embodiment of the invention. Hereinafter, the electronic apparatus including the physical quantity sensor 100 as the physical quantity sensor according to the embodiment of the invention will be explained.

Figure 11:
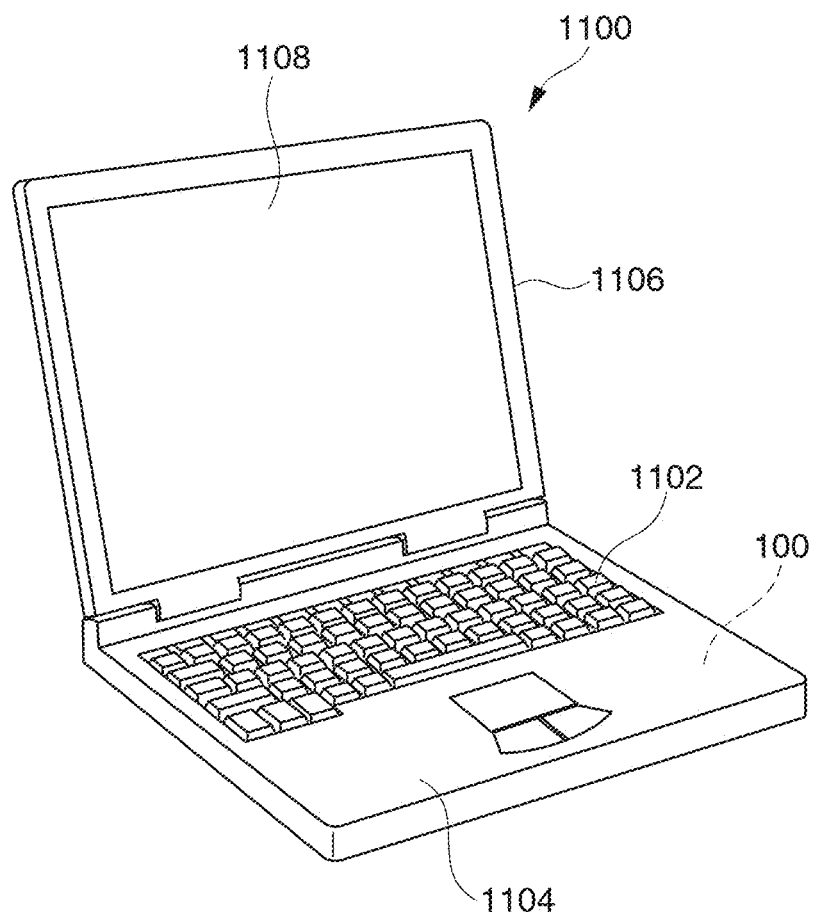
FIG. 11 is a perspective view schematically showing an electronic apparatus according to the embodiment.

FIG. 11 is a perspective view schematically showing a mobile type (or laptop type) personal computer 1100 as the electronic apparatus according to the present embodiment.

As shown in FIG. 11, the personal computer 1100 is composed of a main body section 1104 equipped with a keyboard 1102, and a display unit 1106 equipped with a display section 1108, and the display unit 1106 is pivotally supported with respect to the main body section 1104 via a hinge structure.

Such a personal computer 1100 incorporates the physical quantity sensor 100.

Figure 12:
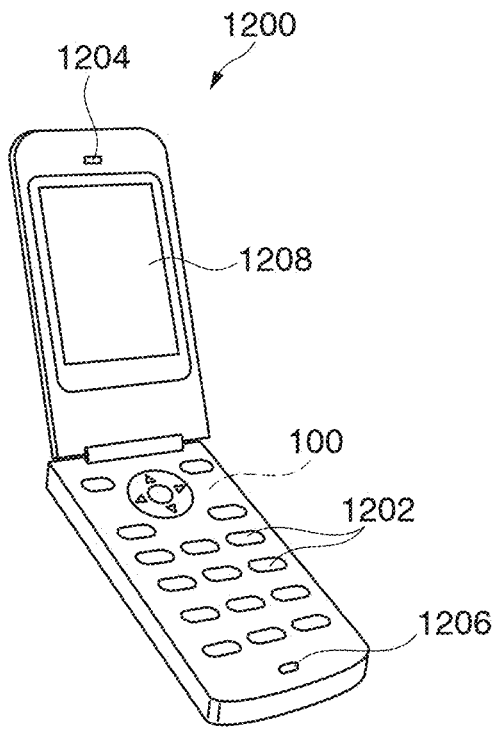
FIG. 12 is a perspective view schematically showing another electronic apparatus according to the embodiment.

FIG. 12 is a perspective view schematically showing a cellular phone (including PHS) 1200 as the electronic apparatus according to the present embodiment.

As shown in FIG. 12, the cellular phone 1200 is provided with a plurality of operation buttons 1202, an ear piece 1204, and a mouthpiece 1206, and a display section 1208 is disposed between the operation buttons 1202 and the ear piece 1204.

Such a cellular phone 1200 incorporates the physical quantity sensor 100.

Figure 13:
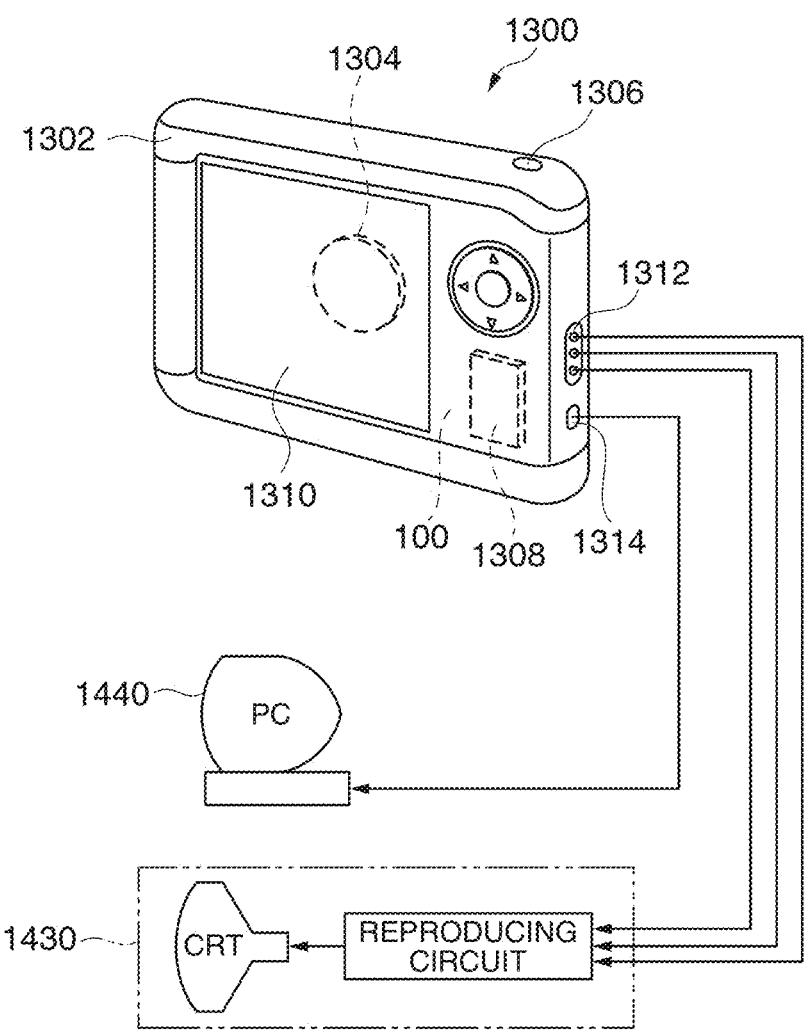
FIG. 13 is a perspective view schematically showing another electronic apparatus according to the embodiment.

FIG. 13 is a perspective view schematically showing a digital still camera 1300 as the electronic apparatus according to the present embodiment. It should be noted that FIG. 13 also shows the connection with external equipment schematically.

Here, typical cameras expose silver salt films to optical images of objects, while the digital still camera 1300 performs photoelectric conversion on optical images of objects by imaging elements such as CCD (charge coupled device) to generate imaging signals (image signals).

The case (body) 1302 of the digital still camera 1300 is provided with a display section 1310 disposed on the back surface thereof to have a configuration of performing display in accordance with the imaging signal from the CCD, wherein the display section 1310 functions as a viewfinder for displaying the objects as electronic images.

Further, the front surface (the back side in the drawing) of the case 1302 is provided with a light receiving unit 1304 including optical lenses (an imaging optical system) and the CCD.

When the photographer confirms an object image displayed on the display section 1310, and then holds down a shutter button 1306, the imaging signal from the CCD at that moment is transferred to and stored in the memory device 1308.

Further, the digital still camera 1300 is provided with video signal output terminals 1312 and an input-output terminal 1314 for data communication disposed on a side surface of the case 1302. Further, a television monitor 1430 and a personal computer 1440 are connected to the video signal output terminals 1312 and the input-output terminal 1314 for data communication, respectively, according to needs. Further, it is arranged that, in accordance with a predetermined operation, the imaging signals stored in the memory device 1308 are output to the television monitor 1430 or the personal computer 1440.

Such a digital still camera 1300 incorporates the physical quantity sensor 100.

Such electronic apparatuses 1100, 1200, and 1300 as described above include the physical quantity sensor 100 having high reliability. Therefore, the electronic apparatuses 1100, 1200, and 1300 can have high reliability.

It should be noted that, as the electronic apparatus provided with the physical quantity sensor 100 described above, there can be cited in addition to the personal computer (the mobile personal computer) shown in FIG. 11, the cellular phone shown in FIG. 12, and the digital still camera shown in FIG. 13, for example, an inkjet ejection device (e.g., an inkjet printer), a laptop personal computer, a television set, a video camera, a video cassette recorder, a variety of types of car navigation system, a pager, a personal digital assistance (including one with communication function), an electronic dictionary, an electric calculator, a computerized game machine, a word processor, a workstation, a video phone, a security video monitor, a pair of electronic binoculars, a POS terminal, a medical device (e.g., an electronic thermometer, an electronic manometer, an electronic blood sugar meter, an electrocardiogram measurement instrument, an ultrasonograph, and an electronic endoscope), a fish detector, various types of measurement instruments, various types of gauges (e.g., gauges for a vehicle, an aircraft, or a ship), and a flight simulator.

The invention includes configurations (e.g., configurations having the same function, the same way, and the same result, or configurations having the same object and the same advantages) substantially the same as those described in the embodiment section. Further, the invention includes configurations obtained by replacing a non-essential part of the configuration described in the embodiment section. Further, the invention includes configurations exerting the same functional effects or configurations capable of achieving the same object as the configuration described in the embodiment section. Further, the invention includes configurations obtained by adding technologies known to the public to the configuration described in the embodiment section.

The entire disclosure of Japanese Patent Application No. 2012-046260, filed Mar. 2, 2012 is expressly incorporated by reference herein.

What is claimed is:

1. A physical quantity sensor comprising:
a substrate having a recess and a periphery surrounding the recess;
a movable body having a movable electrode;
a pivot connected to the movable body, the pivot forming a pivot axis of the movable body;
a fixation section fixed on the periphery of the substrate, the pivot interconnecting the fixation section and the movable body such that the movable body is laterally spaced apart from the fixation section via a gap except at the pivot and is suspended above a bottom surface of the recess;
an opening that is provided in the fixation section directly adjacent to the pivot; and
a fixed electrode disposed on the bottom surface of the recess so as to be opposed to the movable electrode,
wherein the opening intersects the pivot axis,
the movable body, the pivot, the fixation section and the opening are coplanar in a cross sectional view,
the opening is a through hole penetrating entirely through the fixation section and is different from the gap, and
the movable body, the pivot and the fixation section is made from a single continuous member.

2. The physical quantity sensor according to claim 1, wherein
the substrate is formed of an insulating material, and
the movable body is formed of a semiconductor material.

3. The physical quantity sensor according to claim 1, wherein
the opening extends in a direction intersecting with the pivot axis in a plan view.

4. The physical quantity sensor according to claim 1, wherein
the movable body has a mass difference between a first region located at one side with respect to the pivot axis and a second region located at an opposite side with respect to the pivot axis.

5. The physical quantity sensor according to claim 4, wherein
the fixed electrode includes
a first detection electrode disposed at a position opposed to the first region, and
a second detection electrode disposed at a position opposed to the second region.

6. An electronic apparatus comprising:
a display;
the physical quantity sensor according to claim 1; and
a case that houses the display and the physical quantity sensor.

7. The physical quantity sensor according to claim 1, wherein
the fixation section includes a connection section,
the pivot is fixed to the fixation section at the connection section,
the connection section is separated from the substrate such that the connection section does not contact the substrate.

8. A physical quantity sensor comprising:
a substrate having a recess and a periphery surrounding the recess;
a movable body having a movable electrode;
a pivot connected to the movable body, the pivot forming a pivot axis of the movable body;
a fixed electrode disposed on a bottom surface of the recess so as to be opposed to the movable electrode;
a center fixation section provided as part of the movable body, the center fixation section fixedly connecting a lower surface of the movable body to the substrate such that the movable body is suspended above the recess except at the center fixation section;
a connection section interconnecting the center fixation section and first and second parts of the pivot; and
first and second body openings formed through the connection section between the center fixation section and the first and second parts of the pivot, the first and second body openings intersecting the pivot axis,
wherein
the movable body, the pivot, the center fixation section and the first and second body openings are coplanar in a cross sectional view, and the first and second body openings are through holes penetrating entirely through the center fixation section.

\* \* \* \* \*